June 4, 1963 D. J. HAMMERAND 3,092,391

SPINDLE ADAPTER

Filed July 14, 1958 2 Sheets-Sheet 1

INVENTOR.
Donald J. Hammerand
BY John L. Wiegreffe
ATTORNEY

June 4, 1963 D. J. HAMMERAND 3,092,391

SPINDLE ADAPTER

Filed July 14, 1958 2 Sheets-Sheet 2

INVENTOR.
Donald J. Hammerand
BY [signature]
ATTORNEY 3,092,391
Patented June 4, 1963

3,092,391

SPINDLE ADAPTER

Donald John Hammerand, Chicago, Ill., assignor to Admiral Corporation, Chicago, Ill., a corporation of Delaware Filed July 14, 1958, Ser. No. 748,217
2 Claims. (Cl. 274—10)

This invention relates to phonograph record players, and in particular to means by which a stack of large center hole records may be reproduced by an automatic record player intended primarily for records having small center holes.

In greater detail, the invention relates to a centerpost adapter having record supports upwardly thereof on which large center hole records may be magazined for release to the turntable of an automatic record player having a spindle axially of the turntable, the spindle being formed with a shoulder upwardly thereof on which small center hole records may be magazined and which may be released to the turntable by an ejector within the spindle. The adapter is formed to removably receive the spindle therein for its support and to receive motion from the ejector for operation of the record supports to release its magazined records to the turntable. Furthermore, the novel adapter involves improvements on an older adapter disclosed in the co-pending application of James E. Vistain, Jr., filed January 18, 1954, S.N. 404,421 now Patent No. 2,935,324.

Although adapters of the foregoing general description are known to the prior art, their structures were needlessly intricate consequent to which their cost of manufacture was unnecessarily high. Additionally as a result of use over a long period of time, their record support and release mechanism took on a status of sluggish operation, or failed completely to release records from their support.

By the present invention an adapter has been provided which is of simpler construction and consequently less costly than corresponding adapters of prior construction. Furthermore, due to inherent features of the novel adapter, its life is greatly extended relative to corresponding apparatuses of earlier construction.

Therefore, an object of the invention is to simplify the structure of the adapter so that it may be assembled by semi-skilled or unskilled workers.

Another object of the invention is to provide for manufacture of an adapter at a lower cost and consequent lower price to the consumer.

And a third object of the invention is to provide a center post adapter capable of operating satisfactorily over a period of time longer than older adapters could be expected to operate.

Other advantages of the invention will be set forth in part hereinafter and in part will be obvious herefrom, or may be learned by practise with the invention, the same being realized and attained by means of the instrumentalities and combinations pointed out in the appended claims.

Figures 1, 2, 3:
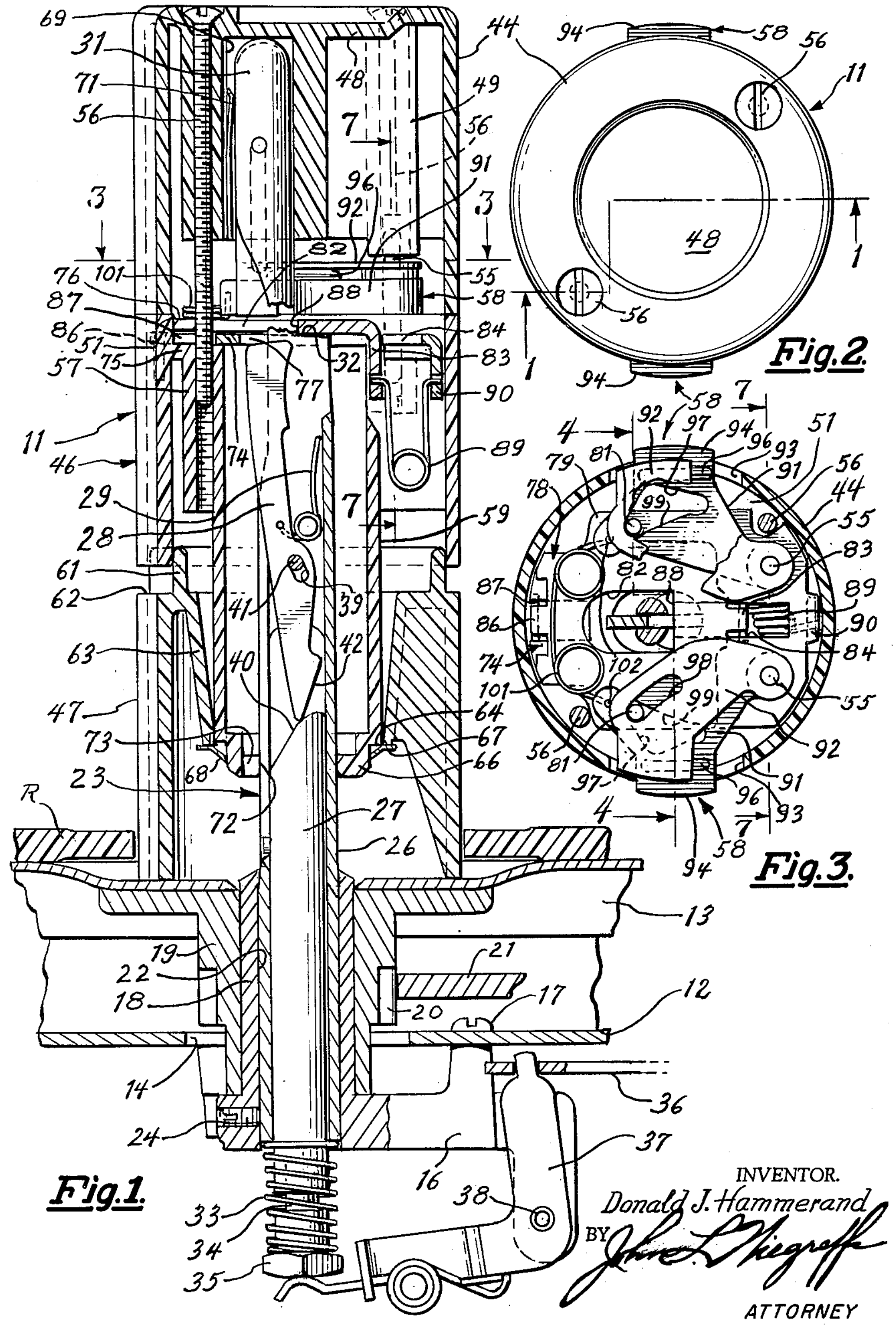
FIG. 1 is a fragmentary sectional view of record player apparatus in conjunction with which the improved centerpost adapter is shown in vertical section as indicated by line 1—1 of FIG. 2.
FIG. 2 is a top plan view of the adapter.
FIG. 3 is a transverse section taken on line 3—3 of FIG. 1.

Throughout the drawings, the reference character 11 is used to denote a center post adapter in its entirety, while 12 denotes the base plate of a record player having a turntable 13 with which the centerpost 11 is associated. The turntable 13 is supported from the base plate 12 and for this to be carried out the base plate is formed with an aperture 14 adjacent to which a bracket 16 is secured to the base plate 12 by screws 17, but one of which is shown. The bracket 16 extends under the aperture 14 where the bracket is formed with a bearing 18 on which a hub portion 19 of the turntable is journalled, the hub resting on the bracket and being formed with a pinion 20 for cyclic cooperation with a mutilated gear 21. The bearing 18 is further formed with an axial bore 22 in which a record player spindle 23 is received and secured against movement, relative to the bearing, by a set screw 24 threaded in the bearing.

The spindle 23, its support and capacity to support as well as release records, are similar to those structures shown in the co-pending applications of James E. Vistain, Jr., Serial No. 218,493, filed March 30, 1951, now abandoned, and Serial No. 255,344, filed November 8, 1951 now Patent No. 2,989,312. Briefly, then, it may be stated that the spindle 23 includes a generally cylindrical and hollow guide shaft 26 having therein a slidable cam rod 27, a record ejector 28, an ejector return spring 29 and pilot portion 31, the pilot portion being offset relative to the remainder of the spindle 23, to provide a record support shoulder 32 for sustaining a stack of small center-hole records when they are threaded over the pilot portion 31. At this time the adapter 11, of course, is removed from the spindle 23. Parts of the spindle are biased to their indicated position, FIG. 1, by a compression spring 33 coiled about the cam rod 27 and an adjustment screw 34, the latter having a head 35 between which and the lower end of guide shaft 26 the spring 33 is confined.

As the record player operates cyclically, on completion of playing a record, a link 36 is reciprocated by means referred to in one of the applications aforesaid, to swing a bell crank lever 37 about its pivot 38 on the bracket 16 and press the rod 27 upward against the resistance of the spring 33. The upward shifting of the cam rod 27 imparts two phases of motion to the ejector 28. First, by engaging its lower end and pressing it upward for a distance permitted by a lost motion connection between the ends of a slot 39, in the ejector 28, and a horizontal pin 41 whose ends are fixed in the walls of the guide shaft 26, the cam rod 27 moves the ejector upward until its upper end is above the level of and to the left, FIG. 1, of the shoulder 32. During this operation that portion of the ejector above the pin 41 is biased counterclockwise by force of the spring 29, one end of which is fixed to the ejector and the remaining end is in slidable pressure engagement with the interior of the shaft 26. Upward motion of the cam rod 27 is, of course, continuous during a cycle and after the upward motion of the ejector has been completed it is swung clockwise due to pressure engagement between a first cam 42, on the lower end of the ejector, and a second cam 40 on the upper end of the cam rod 27. The clockwise motion of the ejector is against the force of spring 29 which also moves the ejector counterclockwise as the rod 27 is moved downward. During this cyclic operation of the ejector, the right side of its upper end swings at least as far as the outer edge of the shoulder 32.

The adapter is constructed for releasable association with the spindle 23. To understand how this may be carried out, it is advisable to first consider the general structure of the adapter. It is cylindrical and includes an upper section or cap 44, an intermediate or mid-section 46 and a bottom or skirt member 47. The outer shell of the adapter is therefore composite and preferably formed of some suitable plastic material such as Bakelite. The cap 44 has a top wall 48 formed with a pair of spaced-apart bosses 49 while the upper end of the mid-section 46 is formed with a horizontal wall 51 and integral bosses 52. When the cap 44 is in assembly with the mid-section, the bosses 49 are spaced from the wall 51 for a purpose later to be indicated. Both of the pairs of bosses are formed with similar axial bores 53 and 54, in which a pair of registration elements or dowels 55 are removably received. The dowels 55 thus provide for registration between the sections 44 and 46 and this is further maintained by a pair of screws 56 passing freely through the wall 48 and threaded in additional bosses 57 integral with the section 46.

The construction just described involves a simplified mode of attaching the cap 44 to the mid-section 46 and therefore enables the parts to be operatively associated with each other in a minimum of time by unskilled workers. Furthermore, advantage is taken of the dowels 55 to provide pivots for pairs of magazine couples 58 confined between the bosses 49 and the wall 51, the magazine couples being described hereinafter. The wall 51 has an integral and axial hollow guide post or journal portion 59 extending downward into the skirt member 47. The upper end of the member 47 is of reduced diameter at its upper end to provide a stub journal section 61 and shoulder 62. The section 61 is arranged to telescope within and have rotation in the mid-section 46. The section 61 is anchored in this relationship to the intermediate section as follows: The skirt member 47 is formed with an integral sleeve 63, extending downward from the vicinity of the stub journal section 61, in which the post 59 is accommodated. Below the lower end of the sleeve 63 the diameter of the post 59 is reduced from a shoulder 64 providing a stud portion 66 on which a spring washer 67 is fixed, it having internal radial teeth 68 for biting engagement with the periphery of the portion 66. The diameter of the washer is sufficiently great to extend under the sleeve 63 and thereby preclude removal of the skirt member from the post 59. The member 47 is therefore floatingly associated with the mid-section 46.

While the adapter 11 is formed to thus receive, at its axis, that portion of the spindle 23 below its shoulder 32, the cap 44 is formed with a socket 69, eccentric of its axis to accommodate the offset pilot portion 31. The socket 69 is further provided with a leaf spring 71 extending longitudinally of the socket from one end thereof where the leaf spring is fixed at one of its ends, to the cap 44 in any suitable manner, such as by friction.

When it is desired to mount the adapter 11 on the spindle 23 the adapter is slid downward thereover, the pilot first entering a hole 72 in the lower end of the post

59, the hole 72 being formed with a lateral notch 73 as clearance for the ejector 28. As it then enters the socket 69 the pilot deflects the spring 71 which biases the pilot toward the axis of the adapter as a safeguard against vibration or rattle between the parts of the spindle and adapter. As the adapter is passed downward its axial movement over the spindle is eventually limited by engagement of the top wall 48 with the upper extremity of the pilot 31. The upper sections 44 and 46 are then secured against turning relative to the spindle 23 owing to the offset status of the pilot portion and its cooperation with the walls of the socket 69, assisted by the leaf spring 71. This enables the skirt 47 to be rotated relative to the mid-section by friction with the turntable 13 and to act as a centering medium for records on the turntable.

Figures 4, 5:
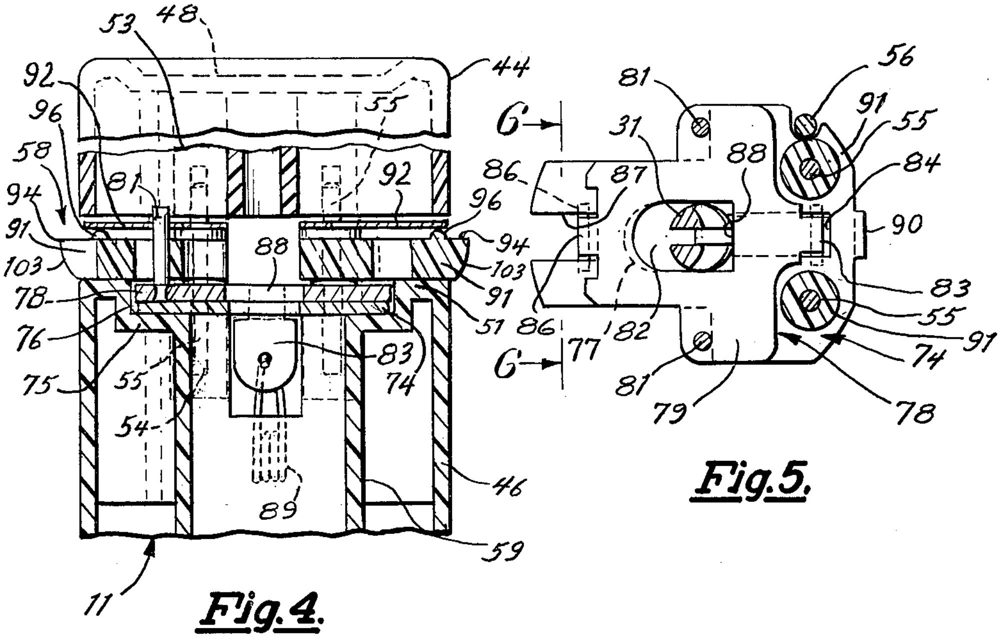
FIG. 4 is a fragmentary section taken on line 4—4 of FIG. 3.
FIG. 5 is a view corresponding to FIG. 3, some of the parts being removed and others in a different position.
Figure 6:
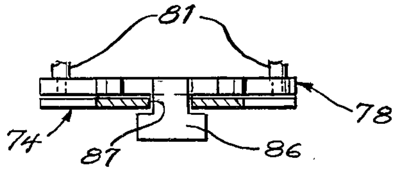
FIG. 6 is a vertical section taken on line 6—6 of FIG. 5.

Mechanism to provide magazine support for records threaded over the adapter and for releasing them from their support in one-by-one order will now be considered. The mechanism comprises a horizontal guide plate 74 supported in a recess 76 in the wall 51, the plate being secured therein against edgewise displacement by the close proximity of its edges to adjacent side walls of the recess. The plate 74 is retained against vertical displacement by a bottom wall 75, FIG. 4, offset relative to the wall 51 and other parts, later to be described, between it and the cap 44. Centrally thereof, the guide plate 74 is formed with an elongated aperture 77 through which the spindle passes and its shoulder 32 extends to within a minute distance of the upper surface of the guide plate. The guide plate 74 is superimposed by a follower mechanism 78 comprising a slider plate or follower carrier 79 bearing a pair of follower pins or followers 81. The slider plate 79 is also formed with a central and elongated aperture 82 to accommodate that portion of the spindle between its shoulder 32 and the pilot 31, the slider being arranged to slide longitudinally thereof under the pilot. In the latter operation, the slider is guided by a front anchor tongue 83 extending downward from one end of the slider through a slot 84 in the guide plate 74 and a rear anchor tongue 86 extending downward from the opposite end of the slider and through a notch 87, of uniform width in the plate 74. Beneath the latter, the anchor tongues are of inverted T-shape to slidably secure the follower carrier to the plate 74.

Normally, that is, between cyclic operations of the bell crank lever 37, the aperture 82 is in staggered relation to the aperture 77 so that a straight edge 88, FIG. 3, of the aperture 82 is at a level above and slightly to the right, FIG. 1, of the upper end of the ejector 28. The follower carrier is biased to this position by a slider spring 89, one of whose ends is anchored to the front anchor tongue 83 and its other end anchored to a depending lug 90 on the guide plate 74. When the bell crank lever 37 is operated, the ejector is first lifted into the aperture 82. Then as the ejector is rocked clockwise from its upper position, it moves the follower mechanism from the position in which it is shown in FIG. 3 to the position it occupies in FIG. 5 by pressing on the straight edge 88 and moving the mechanism against force of the spring 89. When the ejector is later swung counterclockwise by the spring 29, the spring 89 returns the follower mechanism 78 to its normal position.

Figure 7:
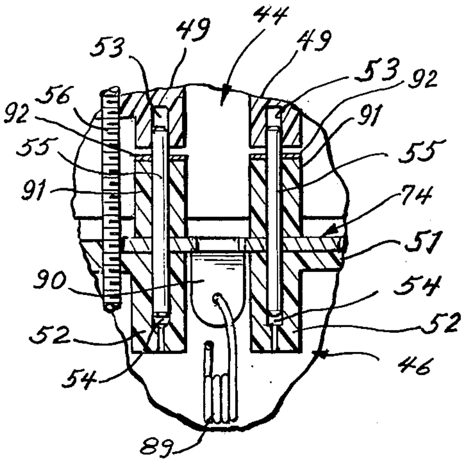
FIG. 7 is a fragmentary vertical section taken on line 7—7 of FIG. 3.

As stated, a stack of records magazined on the adapter 11 is supported above the level of the turntable 13 by a pair of magazine couples 58, each of which includes a record support member 91 and a separator member 92. To accommodate the magazine couples 58, the cap 44, at its base, is formed with diametrically opposed notches 93. Each of the dowels 55 affords a pivot for one of the record supports 91 and a separator 92. The record separators are slidable on the record supports and both are confined against displacement axially of the dowels 55 by the guide plate 74 and the bosses 49, FIG. 7.

In detail, both of the support members 91 are similar with the exception that each is of opposite hand. Both are preferably of some suitable plastic material and formed with record support portions 94 for extension through the notches 93. Adjacent the support portions 94, both of the support members are formed with a pad 96, both to afford a bearing surface for the separator members 92 to ride on and to so space the plane of the separators from the support portions 94 that when a stack of records is magazined on the adapter the separators are arranged at a level to be moved between the bottom magazined record and record immediately next above the bottom magazined record. Each of the support members 91 is formed with a triangular shaped aperture 97 therein for a purpose later to be apparent.

Both of the separator members 92 are preferably of sheet metal after the order of No. 26 U.S. Standard gauge.

For operation of the support members 91 and separator members 92, each of the followers 81 extends through one of the apertures 97 and a slot or positive motion cam 98 in one of the separators 92. Each of the apertures 97 is partly defined by a non-positive motion cam 99 of curvilinear formation, for cooperation with the followers 81. This cooperation is maintained by force of an extension spring 101, the ends of which extend under and upward into anchor holes 102 in the support members 91. When so arranged, the spring 101 is preloaded to bias the support members in opposite directions about their axes and the outward extension of the support portions 94 are limited by engagement of the cams 99 by the followers 81. The cams 99 are so arranged with respect to the followers 81 that when the latter are in their normal positions the support portions 94 are extended beyond the periphery of the cap 44, but as the followers are moved away from their normal position, due to cyclic operation of the ejector 28, the support portions are retracted within the periphery of the cap 44.

Concurrent with these movements of the support members, the separator members 92 are also moved, but in a direction opposite to the direction in which their associated supports are moved. This is due to the arrangement of the cam slots 98 which are arcuate and therefore retain the separators within the periphery of the cap 44, while the support portions 94 are extended to their extreme outer positions and are responsible for extending the separators in advance of withdrawal of the supports within the periphery of the centerpost 11. This is in order that the separators 92 may be extended between the bottom magazined record and remaining records for support of the latter before support for the former is removed for it to drop to the turntable.

Since the support members 91 normally extend beyond the periphery of the cap 44, it is essential that means be provided for removing an accumulation of played records from the turntable without the need of removing the adapter 11 from the spindle 23. Therefore, the tips of the support members 91 are provided with cam surfaces or removal cams 103 which converge downward from the outer extremities of the support portions 94 to the periphery of the adapter 11. By lifting the records upward over the centerpost until the records engage the cams 103, the latter are cammed backward into the adapter against resistance of the spring 101, and the cams 99 being moved out of engagement with the followers 81 owing to the shape of the apertures 97. After the records are moved upward past the support members 91 the latter are, of course, restored to their extended position by the spring 101.

While my invention has been described in an embodiment thereof, I am aware that numerous and extensive departures may be made therefrom without departing from the spirit or scope of the appended claims.

I claim:

1. In a record player having a turntable and central spindle formed with a shoulder on which small center-hole records may be magazined and released to the turntable by a cyclically operated ejector at the shoulder, adapter means to provide magazine support for large center hole records from said spindle and derive motion from said ejector for release of successive lowermost magazined records to said turntable comprising a cylindrical body formed to receive the spindle therein and be thereby supported and to pass through large center hole records and with a pair of opposed magazine apertures upward of said body, a cap portion concentric with said body and disposed thereabove, two pivot pins, a magazine couple including a pivotally mounted record support member at each of the apertures, a record separator member pivotally mounted above each of said supports for movement relative to said apertures, each separator member and its corresponding support member being mounted on one of said pivot pins, the upper ends of said pins being supported by said cap portion, the lower ends of said pins being supported by said body, means to operate said supports and separators from said ejector comprising a guide member fixed to said body at the level of said ejector, a follower mechanism including a pair of cam pins slidably anchored to said guide member, a first closed cam slot on each of said supports, a second closed cam slot on each of said separators, said cam slots receiving said cam pins and being formed for moving said separators and/or said supports in opposite directions when said mechanism is moved, and a spring anchored to said guide and said follower mechanism to bis said mechanism to a normal position in association with said ejector between operations of said ejector for the supports of both of said magazine couples to be extended outward of the body to carry a plurality of records and the separators concurrently retracted within said body, said ejector when operated pressing on said follower mechanism and moving said separators outward of said spindle and between said bottom magazined record and remaining magazined records in advance of retraction of said supports within said magazine apertures to support the records above said bottom record before said bottom magazined record is released to said turntable by retraction of said supports within said magazine apertures.

2. In a record player having a turntable and central spindle formed with a shoulder on which small center-hole records may be magazined and released to the turntable by a cyclically operated ejector at the shoulder, an adapter to provide magazine support for large center-hole records from said spindle and derive motion from said ejector for release of successive lowermost magazined records to said turntable comprising a composite body formed to receive the spindle therein and be thereby supported and to pass through large center-hole records including a mid-section, a cap section formed with opposed magazine notches therein and releasably fixed to said mid-section, a horizontal guide member between said sections, means to anchor said member to said body including a pair of spaced vertical guide pins extending through said member, said mid-section being formed with lower sockets arranged to receive for support the lower ends of said pins, said cap being formed with upper sockets coaxial with said lower sockets to supportingly receive the upper ends of said pins, a follower mechanism including a carrier member, anchor portions on one of said members, said other member being formed with anchor slots to slidably receive said anchor portions for said follower mechanism to be slidably anchored to said guide, a magazine couple including a record support journalled on each of said pins, a record separator also journalled on each of said pins above each of said supports, a spring connected to said mechanism and said guide for biasing said mechanism into operative association with said ejector and between operations of the latter providing a normal position for said mechanism and arranged to be moved away from its normal position by pressure of said ejector thereon when the latter is operated, a first cam on each of said supports, and a second cam on each of said separators, the cams of each of said couples being formed to swing said support and said separator in opposite directions by cooperating with said follower mechanism when said mechanism is moved, both of said supports extending outward of said magazine notches when said mechanism is in its normal position to provide magazine support for records magazined on said supports and said separators concurrently being retracted within said body, said separators being extended and slid between the bottom and remaining magazined records for support of said remaining records while said separators are concurrently retracted to release the bottom record to said turntable.

References Cited in the file of this patent

UNITED STATES PATENTS

| | | |
|---|---|---|
| 2,666,648 | Dale | Jan. 19, 1954 |
| 2,858,134 | Maris | Oct. 28, 1958 |
| 2,898,116 | Falk | Aug. 4, 1959 |
| 2,935,324 | Vistain | May 3, 1960 |

FOREIGN PATENTS

| | | |
|---|---|---|
| 1,073,502 | France | Feb. 29, 1952 |
| 791,408 | Great Britain | Mar. 5, 1958 |